US010673024B2

(12) United States Patent
Kim

(10) Patent No.: US 10,673,024 B2
(45) Date of Patent: Jun. 2, 2020

(54) POUCH TYPE SECONDARY BATTERY COMPRISING SAFETY MEMBER

(71) Applicant: LG Chem, Ltd., Seoul (KR)

(72) Inventor: Ji-Hyun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/540,478

(22) PCT Filed: Jul. 27, 2016

(86) PCT No.: PCT/KR2016/008248
§ 371 (c)(1),
(2) Date: Jun. 28, 2017

(87) PCT Pub. No.: WO2017/018810
PCT Pub. Date: Feb. 2, 2017

(65) Prior Publication Data
US 2017/0358783 A1    Dec. 14, 2017

(30) Foreign Application Priority Data

Jul. 27, 2015    (KR) .................. 10-2015-0105980

(51) Int. Cl.
*H01M 2/02*    (2006.01)
*H01M 10/052*    (2010.01)
(Continued)

(52) U.S. Cl.
CPC ........... *H01M 2/0202* (2013.01); *H01M 2/02* (2013.01); *H01M 2/0275* (2013.01);
(Continued)

(58) Field of Classification Search
CPC .... H01M 2/02; H01M 2/0202; H01M 2/0275; H01M 2/0287; H01M 2/08;
(Continued)

(56) References Cited

U.S. PATENT DOCUMENTS 7,476,468 B1 * 1/2009 Lam ...................... H01M 2/127
429/326
2007/0207379 A1 * 9/2007 Hatta ................... H01M 2/0207
429/176
(Continued)

FOREIGN PATENT DOCUMENTS

JP    2005209587 A  *  8/2005
JP    2009099322 A    5/2009
(Continued)

OTHER PUBLICATIONS

Machine translation for KR 20110039012 A. (Year: 2018).*
(Continued)

*Primary Examiner* — Tracy M Dove
(74) *Attorney, Agent, or Firm* — Lerner, David, Littenberg, Krumholz & Mentlik, LLP

(57) ABSTRACT

The present invention relates to a pouch type secondary battery comprising a safety member, such as dodecafluoro-2-methylpentane-3-one, between an external pouch and an internal pouch, wherein the safety member allows the cell temperature to be kept low or enables extinguishing at the time of cell ignition, and has an effect of improving the suppression of moisture permeation.

17 Claims, 3 Drawing Sheets

(51) Int. Cl.
  *H01M 10/058* (2010.01)
  *H01M 10/42* (2006.01)
  *H01M 10/647* (2014.01)
  *H01M 10/613* (2014.01)
  *H01M 10/61* (2014.01)
  *H01M 2/06* (2006.01)
  *H01M 2/08* (2006.01)

(52) U.S. Cl.
  CPC ........... *H01M 2/0287* (2013.01); *H01M 2/06* (2013.01); *H01M 2/08* (2013.01); *H01M 10/052* (2013.01); *H01M 10/058* (2013.01); *H01M 10/42* (2013.01); *H01M 10/61* (2015.04); *H01M 10/613* (2015.04); *H01M 10/647* (2015.04); *H01M 2002/0205* (2013.01)

(58) Field of Classification Search
  CPC .. H01M 10/058; H01M 10/61; H01M 10/647; H01M 2002/0205
  See application file for complete search history.

(56) References Cited

U.S. PATENT DOCUMENTS

| | | | |
|---|---|---|---|
| 2009/0023058 A1* | 1/2009 | Kim | H01M 2/0207 429/131 |
| 2009/0098443 A1 | 4/2009 | Yamamoto et al. | |
| 2010/0062328 A1 | 3/2010 | Takagi | |
| 2011/0091761 A1* | 4/2011 | Miller | H01M 2/162 429/143 |
| 2011/0212361 A1* | 9/2011 | Kim | B32B 27/08 429/176 |
| 2012/0258347 A1 | 10/2012 | Yokoyama et al. | |
| 2015/0318518 A1 | 11/2015 | Kim | |

FOREIGN PATENT DOCUMENTS

| | | | |
|---|---|---|---|
| JP | 2010086803 A | | 4/2010 |
| JP | 2012169166 A | | 9/2012 |
| KR | 20090038382 A | | 4/2009 |
| KR | 20110039012 A | * | 4/2011 |
| KR | 20110039012 A | | 4/2011 |
| KR | 20130024596 A | * | 3/2013 |
| KR | 20130024596 A | | 3/2013 |
| KR | 20140048602 A | | 4/2014 |
| KR | 101452001 B1 | | 10/2014 |
| KR | 20140133218 A | | 11/2014 |

OTHER PUBLICATIONS

Machine translation for KR 20130024596 A (Year: 2018).*
Machine translation for JP 2005-209587 A. (Year: 2019).*
Machine translation for Iwamoto et al., JP 2005-209587 A.*
Machine translation for Kang et al., KR 20130024596 A.*
Supplementary European Search Report for European Patent Application No. 16830843 dated May 7, 2018.
International Search Report for PCT/KR2016/008248, dated Nov. 28, 2016 (3 pages).

* cited by examiner

POUCH TYPE SECONDARY BATTERY COMPRISING SAFETY MEMBER

CROSS REFERENCE TO RELATED APPLICATIONS

The present application is a national phase entry under 35 U.S.C. § 371 of International Application No. PCT/KR2016/008248, filed Jul. 27, 2016, published in Korean, which claims the benefit of Korean Patent Application No. 10-2015-0105980 filed on Jul. 27, 2015, with the Korean Intellectual Property Office, the disclosures of which are herein incorporated by reference in their entirety.

TECHNICAL FIELD

The present disclosure relates to a pouch-type secondary battery including a safety member.

BACKGROUND ART

With the widespread use of portable electric products including video cameras, mobile phones and portable PCs, the importance of secondary batteries primarily used as a power source to power the portable electric products is increasing. Particularly, lithium secondary batteries is increasingly used in a wide range of applications because they have higher energy density per unit weight and allow faster charge than conventional lead accumulators and other secondary batteries such as nickel-cadmium batteries, nickel-hydrogen batteries and nickel-zinc batteries.

Generally, secondary batteries are rechargeable unlike primary batteries that cannot be recharged, and with the development of digital cameras, cellular phones, laptop computers and hybrid vehicles in the high-tech field, many studies have been made on secondary batteries. Secondary batteries include nickel-cadmium batteries, nickel-metal hydride batteries, nickel-hydrogen batteries and lithium secondary batteries. Among them, lithium secondary batteries have the operating voltage of 3.6V or higher and can be used as a power source of portable electronic devices or in high-output hybrid vehicles when connected in series, and there is a fast growing trend in using lithium secondary batteries whose the operating voltage is three times higher and the characteristics of energy density per unit weight are better than nickel-cadmium batteries or nickel-metal hydride batteries.

Lithium secondary batteries can be classified into lithium ion batteries using a liquid electrolyte and lithium ion polymer batteries using a polymer solid electrolyte according to the type of electrolyte. Furthermore, lithium ion polymer batteries can be classified into all-solid-state lithium ion polymer batteries containing no electrolyte solution and lithium ion polymer batteries using a gel-type polymer electrolyte containing an electrolyte solution according to the type of polymer solid electrolyte.

In the case of lithium ion batteries using a liquid electrolyte, a cylindrical or prismatic metal can hermetically sealed by welding is usually used as a container. Can-type secondary batteries using a metal can as a container have a fixed shape, so this disadvantage restricts the design of electric products using such batteries as a power source and it is difficult to reduce the volume. Accordingly, pouch-type secondary batteries fabricated by putting two electrodes, a separator and an electrolyte in a pouch made of a film and sealing were developed and is being used.

FIG. 1 shows an embodiment of a conventional pouch-type secondary battery, in which a pouch 100 is largely divided into a lower sheet 20 and an upper sheet 10 that is situated over it, and an electrode assembly 30 that is embedded in the pouch 100 is formed by stacking and winding a positive electrode, a negative electrode and a separator. After the electrode assembly is received inside, the upper sheet 10 and the lower sheet 20 are sealed along the edges by heat fusion to form a sealing part 23. Furthermore, tabs 37, 38 drawn from each electrode are bonded to electrode leads 39, 40, and a tape 41 may be attached to the electrode leads 39, 40 at an overlapping part with the sealing part 23.

The upper sheet 10 is representatively disclosed for explaining the structure of the pouch having the upper sheet 10 and the lower sheet 20. The upper sheet 10 has a multilayered film structure including an inner layer or a polyolefin-based resin layer that can be heat-welded and serves as a sealant, a metal layer or an aluminum layer that serves as a substrate for maintaining the mechanical strength and a barrier layer against moisture and oxygen, and an outer layer (generally a nylon layer) that acts as a substrate and a protective layer, stacked in a sequential order. For the polyolefin-based resin layer, casted polypropylene (CPP) is commonly used.

Advantages of pouch-type secondary batteries are that there is flexibility in shape and secondary batteries having the same capacity can be realized with smaller volume and mass. However, as opposed to can-type secondary batteries, pouch-type secondary batteries have weak mechanical strength and moisture permeation risks due to using a pouch of a soft material as a container, and have safety problems with explosions of the batteries that may occur due to high temperature and high voltage inside of the batteries caused by abnormal battery operation, for example, internal shorts, overcharge beyond the allowed current and voltage, exposure to high temperature, and impacts caused by falling. Especially, automobile batteries require high capacity, and as the capacity is higher, the safety is poorer.

Furthermore, conventional pouch-type secondary batteries include an electrolyte solution in a pouch, and vapor-phase molecules of the electrolyte solution can penetrate into a sealing part by diffusion in the sealing process. Local defects or micro-cracks by the electrolyte solution molecules penetrated into the sealing part become an electrical path to the outside, causing destruction of insulation resistance of the batteries.

Many studies have been made to improve safety of batteries, but there are still rooms for improvements.

DISCLOSURE

Technical Problem

The present disclosure is designed to solve the problems of the related art such as those mentioned above, and therefore, the present disclosure is directed to providing a pouch for a secondary battery with improved safety for preventing battery fires or extinguishing fires, if fires happen, in the event of high internal temperature of the battery due to abnormal battery operation, and a pouch-type secondary battery including the same.

The present disclosure is further directed to providing a pouch-type secondary battery in which pouch volume expansion is prevented when heat is generated from the secondary battery.

The present disclosure is further directed to providing a pouch for a secondary battery with enhanced sealability and reduced moisture permeation risks and a pouch-type secondary battery including the same.

The present disclosure is further directed to providing a pouch for a secondary battery with improved insulation effect.

Technical Solution

To achieve the object, according to an embodiment of the present disclosure, there is provided a pouch-type secondary battery including an electrode assembly including a positive electrode, a negative electrode, and a separator interposed between the positive electrode and the negative electrode, wherein the electrode assembly is received in an internal pouch such that electrode leads are drawn from the internal pouch, the internal pouch is received in the external pouch such that the electrode leads are drawn from the external pouch, and a safety member is included in a space between the internal pouch and the external pouch.

The safety member may be one selected from the group consisting of nitrogen gas, alkylene glycol, 1,3-propenediol, ferrocene derivatives, organic acid-based compounds, dodecafluoro-2-methylpentan-3-one, decafluoro-2-methylbutan-3-one, 1,1,1,3,3,4,4,5,5,5-decafluoropentan-2-one, 1,1,1,2,2,4,4,5,5,5-decafluoropentan-3-one, 1,1,1,4,4,5,5,5-octafluoro-3-bis (trifluoromethyl) -pentan-2-one, dodecafluoro-4-methylpentan-2-one, dodec afluoro-3-methylpentan-2-one, dodecafluoro-3,3-(dimethyl)butan-2-one and dodecafluorohexan-3-one, or mixtures thereof.

The volume of the space between the internal pouch and the external pouch may be 5 vol % or more and less than 10 vol % on the basis of the total volume of the pouch-type secondary battery fabricated in the end.

The pouch-type secondary battery may include electrode leads to which a lead tape for internal pouch and a lead tape for external pouch are attached.

The lead tape for internal pouch may be positioned at an internal pouch sealing part, and the lead tape for external pouch may be positioned at an external pouch sealing part.

The internal pouch is received in an external pouch with sealing part of the internal pouch being folded up or down.

According to another embodiment of the present disclosure, there is provided a method for fabricating the pouch-type secondary battery including (S1) receiving the electrode assembly in the internal pouch such that the electrode leads are drawn from the internal pouch, and hermetically sealing edges of the internal pouch; (S2) receiving the internal pouch in the external pouch such that the electrode leads are drawn from the external pouch, and hermetically sealing edges of the external pouch except an electrode lead draw part and an inlet through which the safety member is to be introduced; (S3) introducing the safety member into a space between the internal pouch and the external pouch through the inlet; and (S4) completely hermetically sealing the safety member inlet.

Advantageous Effects

The pouch-type secondary battery including the safety member according to an embodiment of the present disclosure has the following effect; in the event of abnormal battery operation, the battery (cell) temperature is maintained at low levels or battery (cell) fires are extinguished, if fires happen, by the safety member interposed between the external pouch and the internal pouch.

Furthermore, the safety member has an effect in preventing the pouch swelling.

Additionally, double sealing of the internal pouch and the external pouch for the electrode assembly and the electrolyte solution prevents moisture permeation from the outside more effectively.

Moreover, because the external pouch and the internal pouch are used together, there is an effect on insulation improvements of the secondary battery.

MODE FOR CARRYING OUT THE INVENTION

Figure 1:
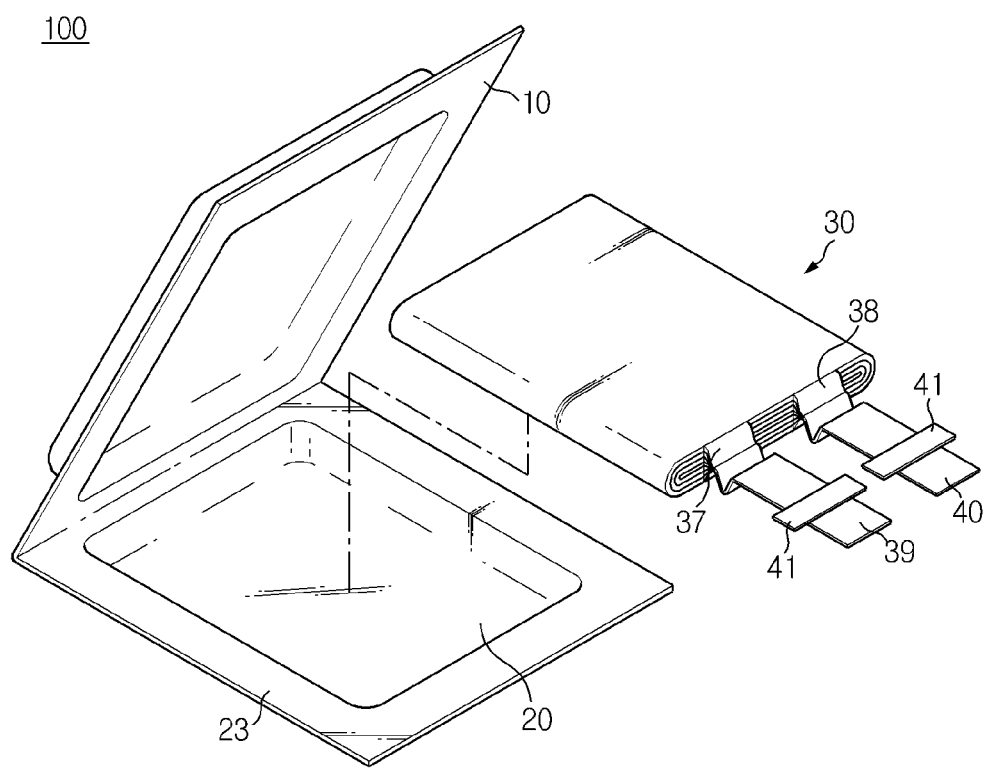
FIG. 1 is a diagram schematically showing the structure of a conventional pouch-type secondary battery.

Hereinafter, the preferred embodiments of the present disclosure will be described in detail with reference to the accompanying drawings. Prior to the description, the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation.

Accordingly, the embodiments stated herein and illustrations in the drawings are just the most preferred embodiment of the present disclosure, and do not represent all the technical aspects of the present disclosure, so it should be understood that many equivalents and modifications could be made thereto as alternatives at the time the application is filed.

Figure 2:
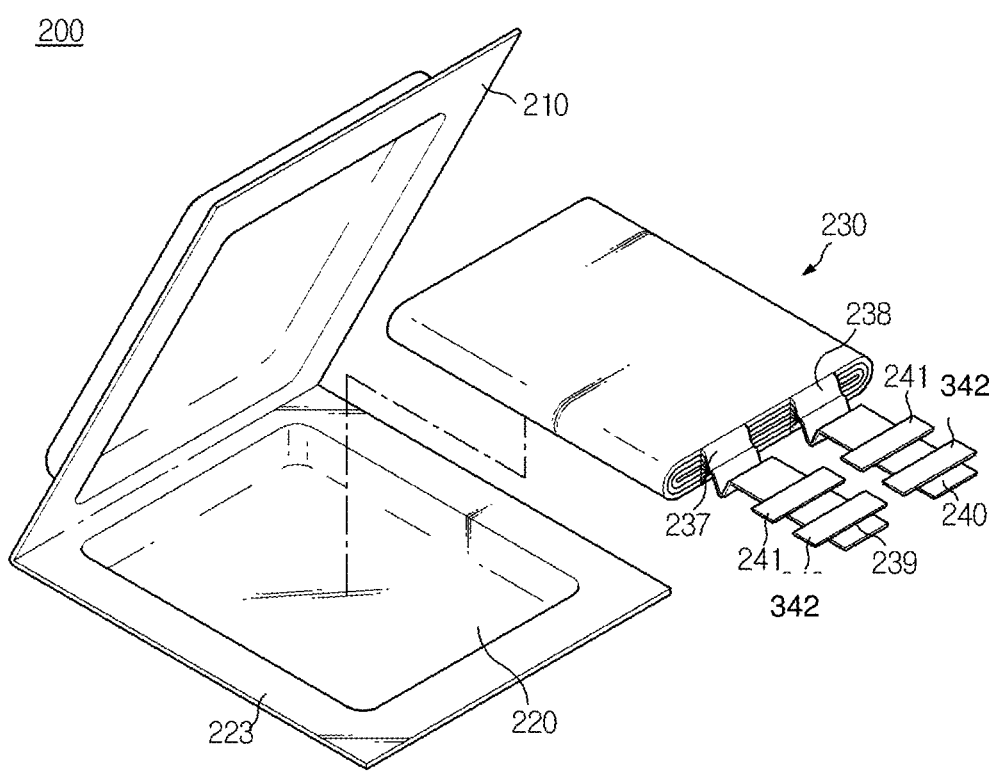
FIG. 2 is a diagram schematically showing an electrode assembly applied to an internal pouch according to an embodiment of the present disclosure.

Hereinafter, the present disclosure is described in detail with reference to FIGS. 2 and 3.

A pouch for a secondary battery according to the present disclosure includes an internal pouch 200 and an external pouch 300, wherein a safety member (not shown) is included between the internal pouch 200 and the external pouch 300, and an electrode assembly 30 is received in the internal pouch 200.

The electrode assembly and an electrolyte solution are received in the internal pouch 200, and the safety member is placed outside of the internal pouch 200, more particularly, in a space between the internal pouch 200 and the external pouch. The internal pouch 200 may be in a form of a resin layer alone or a laminate sheet comprising a resin layer and a metal layer. The resin and metal may be any materials and in shapes commonly used in the art so long as they are not reactive with the electrolyte solution and the safety member. Since the electrolyte solution is included in the internal pouch, an internal pouch sealing part cut surface does not touch any external metal and the electrolyte solution is not included in the external pouch, the battery insulation problem can be eliminated or minimized Thus, the insulation requirements are not tight and there is a wide selection of internal pouch materials.

Non-limiting examples of the pouch sheet that forms the internal pouch include a heat fusion layer, a metal layer and an outer layer, and may include a larger number of functional layers if necessary. The heat fusion layer is surfaces that face each other at the edges of an upper sheet 210 and a lower sheet 220 of the pouch for a secondary battery according to an embodiment of the present disclosure, and the metal layer and the outer layer are stacked thereon and bonded thereto in a sequential order, to form a sealing part 223. Or, the internal pouch sheet may be formed from many other alternative material layers.

For the heat fusion layer, polymer resin materials that can be heat-welded (heat-adhered) and have low wettability to prevent electrolyte solution penetration, and do not expand or corrode by the electrolyte solution may be used, and for example, resin selected from the group consisting of cast polypropylene (CPP), polypropylene chloride, polyethylene, ethylenepropylene copolymer, copolymer of polyethylene and acrylic acid and copolymer of polypropylene and acrylic acid may be used.

The metal layer may be formed from materials having not only function to prevent the introduction or leaks of impurities such as gas and moisture but also function to improve the strength of the pouch, and specifically, aluminum may be used.

The outer layer needs to have high resistance to the safety member surrounding the internal pouch. Non-limiting examples include polyethyleneterephthalate (PET) and oriented nylon film.

The total thickness of the internal pouch sheet may be generally 40 to 200 μm, and the outer layer and the inner layer may be 10~120 μm thick, and the metal layer may be 20~120 μm thick, but are limited thereto.

The electrode assembly and the electrolyte solution are received in the internal pouch.

The electrode assembly 230 has electrode tabs 237, 238, and electrode leads 239, 240 are bonded to the electrode tabs 237, 238 and drawn from the internal pouch and the external pouch. A lead tape 241 may be provided on the electrode leads 239, 240 to improve adhesion of the pouch sheets of each of the internal pouch and the external pouch to the electrode leads. According to an embodiment of the present disclosure, in addition to the lead tape 241 for improving adhesion in sealing the internal pouch 200, a lead tape 342 (FIG. 3) may be provided on the electrode leads 239, 240 to improve adhesion in sealing the external pouch. The lead tape may be positioned on the electrode leads 239, 240, taking into account the sealing part 223 position at the internal pouch 200 where sealing is performed and the sealing part 323 position at the external pouch where sealing is performed.

The lead tape is not limited to a particular type and includes any material commonly used in the art capable of improving adhesion of the electrode leads and the pouch sheets. For example, the lead tape may be made of polyethylene, polyacetylene, polytetrafluoroethylene(PTFE), nylon, polyimide, polyethyleneterephthalate, polypropylene, or their synthetic materials.

The internal pouch 200 having the electrode assembly 230 received therein is sealed at the sealing part 223, and in this instance, the lead tape 241 is positioned at an area corresponding to the internal pouch sealing part 223 on the electrode leads 239, 240 connected to the electrode tabs of the electrode assembly 230 to improve adhesion of the internal pouch sheet.

Except the end part from which the electrode terminals are drawn, the internal pouch sealing part 223 may be folded up or down to minimize the volume and then the internal pouch is received in the external pouch, and the folded sealing part may be fixed to the internal pouch by a fixing member means including, but not limited to, a tape. In other embodiment, the sealing part 223 may not be folded up or down when the internal pouch is received in the external pouch.

Figure 3:
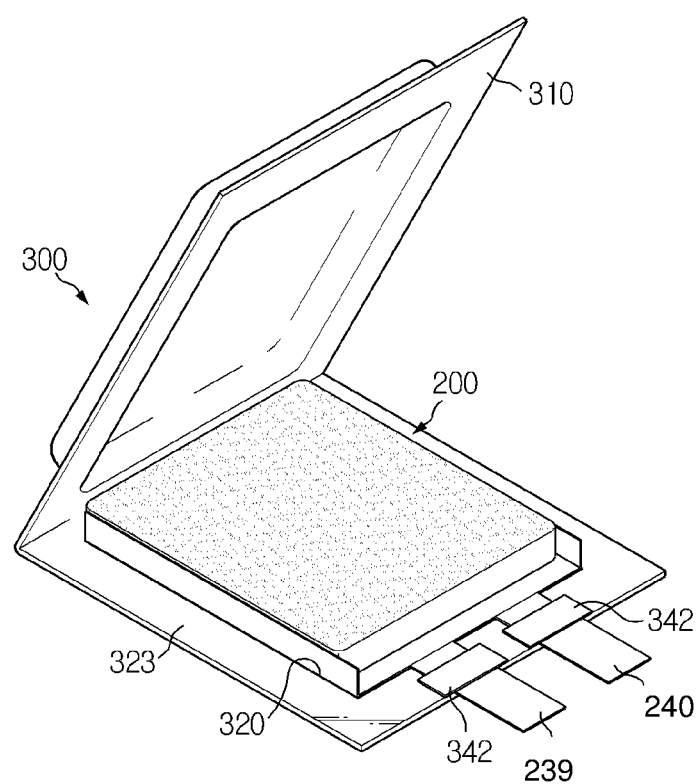
FIG. 3 is a diagram schematically showing an external pouch applied to a sealed internal pouch according to an embodiment of the present disclosure.

Referring to FIG. 3, the internal pouch 200 having the electrode assembly received therein is received in the external pouch 300.

The external pouch 300 includes, but is not limited to, an upper sheet 310 and a lower sheet 320. The external pouch 300 may be formed from a laminate sheet comprising a heat fusion layer, a metal layer and an outer layer, and they are not limited to a particular type of material and shape. That is, the external pouch 300 may be made of materials and in shapes commonly used in the art.

For example, for the heat fusion layer, resin selected from the group consisting of cast polypropylene (CPP), polypropylene chloride, polyethylene, ethylenepropylene copolymer, copolymer of polyethylene and acrylic acid, and copolymer of polypropylene and acrylic acid may be used as described with regard to the internal pouch. Furthermore, for the metal layer, aluminum may be used. Furthermore, for the outer layer, polyethyleneterephthalate (PET) and oriented nylon film may be used. The external pouch 300 may be formed of a material that is identical or different from that of the internal pouch 200.

The external pouch 300 is manufactured in a larger size than the internal pouch 200 to completely receive the internal pouch 200 except that the electrode leads are drawn out of the external pouch 300. The size of the external pouch may be designed taking into account the requirements for specific applications or desired margins. However, in order to ensure the effects of the safety member while preventing excessive volume increases due to the presence of the safety member in the external pouch, it is desirable to design the external pouch such that the volume of the space between the external pouch and the internal pouch is 5 to 50 vol %, more preferably less than 10 vol % of the total volume occupied by the battery.

Electrode leads 239, 240 drawn from the internal pouch 200 may have a lead tape 342 such that the lead tape 342 is seated corresponding to a sealing area of the external pouch 300 to achieve better external pouch sealing. The material of the lead tape 342 is the same as the above, and may be identical or different from that of the lead tape 241 provided to improve sealing of the internal pouch 200 sheet.

The safety member is included in the space between the internal pouch and the external pouch.

For the safety member, materials having high thermal capacity that are contained in the space between the internal pouch and the external pouch to absorbs heat in the event of heat generation so that the battery temperature is maintained at low levels can be used. Or, for the safety member, materials capable of extinguishing or inhibiting battery (cell) fires can be used. Furthermore, for the safety member, materials having small volume changes with temperature changes are preferably used. Non-limiting examples of the materials include, but are not limited to, one selected from the group consisting of nitrogen gas; alkylene glycol such as ethylene glycol or propylene glycol; 1,3-propanediol; ferrocene derivatives such as ferrocene aldehyde or ketone compounds, or ferrocene carboxylic acid compounds or their derivatives, or ferrocene alcohol, phenol or ether compounds, or ferrocene hydrocarbon compounds, or nitrogen-containing ferrocene compounds, or sulfur-containing or phosphorus-containing ferrocene compounds, or silicone-containing ferrocene compounds, or heterocyclic ferrocene compounds; compounds such as organic acid-based compounds such as capric acid, dodecanoic acid, tetradecanoic acid, hexadecanoic acid, heptadecanoic acid, octadecanoic acid, eicosanoic acid, docosanoic acid, hexacosanoic acid, hentriacontylic acid, dotriacontanoic acid, crotonic acid, oleic acid, heptadecenoic acid, hexadecenoic acid, hexadienic acid, oxalic acid, malonic acid, succinic acid, glutaric acid, pimelic acid, suberic acid, sebacic acid, brassylic acid, hexadecanedioic acid, cis-crotonic acid, trans-crotonic acid, 2-hydroxypropionic acid, 2-hydroxybutanedioic acid, 2,3-dihydroxybutanedioic acid, 2-hydroxy-1,2,3-propanetricarboxylic acid, 3-phenyl-2-propenoic acid, 2-hydroxybenzoic acid, 3,4,5-trihydroxy benzoic acid, benzoic acid or methylguanidoacetic acid; dodec afluoro-2-methylpentan-3-one, decafluoro-2-methylbutan-3-one, 1,1,1,3,3,4,4,5,5,5-decafluoropentan-2-one, 1,1,1,2,2,4,4,5,5,5-decafluoropentan-3-one, 1,1,1,4,4,5,5,5-octafluoro-3-bis (trifluoromethyl)-pentan-2-one, dodec afluoro-4-methylpentan-2-one, dodec afluoro-3-methylpentan-2-one, dodecafluoro-3,3-(dimethyl) butan-2-one and dodecafluorohexan-3-one, or mixtures thereof.

The space between the external pouch and the internal pouch is 5 to 50 vol %, preferably less than 10 vol % on the basis of the total volume of the pouch-type secondary battery fabricated in the end, and the entire space between the external pouch and the internal pouch is filled with the safety member, so that the battery (cell) temperature is maintained at low levels or battery (cell) fires can be extinguished if fires happen, and an excessive reduction in energy density of the battery can be prevented. Alternatively, in other embodiment, the pouch may be configured such that the safety member is present around the part from which the electrode leads are drawn, if necessary.

According to another embodiment of the present disclosure, there is provided a method for manufacturing a pouch for a secondary battery including (S1) receiving an electrode assembly in an internal pouch such that electrode leads are drawn from the internal pouch and hermetically sealing the edges of the internal pouch, (S2) receiving the internal pouch in an external pouch such that the electrode leads are drawn from the external pouch, and hermetically sealing the edges of the external pouch except an electrode lead draw part and an inlet through which the safety member is to be introduced, (S3) introducing the safety member into a space between the internal pouch and the external pouch through the inlet, and (S4) completely hermetically sealing the safety member inlet.

When the safety member is in solid state, if necessary, instead of performing (S3), the process of applying the safety member to the pouch may be performed beforehand. For example, the solid safety member is dispersed in a solvent that is electrically stable, for example, water, to prepare a slurry, and the slurry may be applied to the inner surface of the external pouch. Alternatively, the solid safety member may be made in the form of a film and attached to the outer surface of the internal pouch or the inner surface of the external pouch. Alternatively, the solid safety member may be put in an envelope made of an insulating non-woven fabric, sealed, and placed on or attached to the outer surface of the internal pouch or the inner surface of the external pouch. The solvent used in the slurry is a solvent that does not react with the safety member and is electrically stable, for example, water. And, in order to add an adhesive substance, the slurry may further include a binder commonly used in the art. If necessary, the pouch may be manufactured such that the safety member is around the area at which the electrode leads are positioned.

The external pouch 300 having the internal pouch 200 received therein is sealed along the edges except the inlet through which the safety member will be introduced, and after the safety member is introduced, the sealing part 323 is completely sealed.

According to still another embodiment of the present disclosure, there is provided a pouch-type secondary battery characterized in that an electrode assembly including a positive electrode, a negative electrode, and a separator interposed between the positive electrode and the negative electrode and an electrolyte are received in an internal pouch, the internal pouch is received in an external pouch, a safety member is included in a space between the internal pouch and the external pouch, electrode tabs extend from each of the positive electrode and the negative electrode and are bonded to electrode leads, the electrode leads are provided with a lead tape for sealing of the internal pouch and a lead tape for sealing of the external pouch, and the electrode leads are drawn from the external pouch.

As the safety member is introduced between the internal pouch and the external pouch after the internal pouch is completely sealed by sealing, the safety member is absent in the internal pouch. Accordingly, battery performance degradation that may occur when the safety member is included in the electrolyte solution is avoided. Rather, due to the safety member, there is an effect on the prevention of pouch expansion that may occur in the event of heat generation from the battery.

In the foregoing, the positive electrode includes a positive electrode active material and a positive electrode current, and the negative electrode includes a negative electrode active material and a negative electrode current collector.

In the present disclosure, the positive electrode may be manufactured by applying a mixture of the positive electrode active material, a conductive material and a binder to the positive electrode current collector and drying, and if necessary, a filler may be added to the mixture. The positive electrode active material includes, but is not limited to, layered compounds of lithium cobalt oxide ($LiCoO_2$) and lithium nickel oxide ($LiNiO_2$) or compounds with other transition metal substitution; lithium manganese oxide of formula $Li_{1+x}Mn_{2-x}O_4$ (where x is 0~0.33), $LiMnO_3$, $LiMn_2O_3$, $LiMnO_2$; lithium copper oxide ($Li_2CuO_2$); vanadium oxide such as $LiV_3O_8$, $V_2O_5$, $Cu_2V_2O_7$; Ni site type lithium nickel oxide represented by formula $LiNi_{1-x}M_xO_2$ (where M=Co, Mn, Al, Cu, Fe, Mg, B or Ga, x=0.01~0.3); lithium manganese composite oxide represented by formula $LiMn_{2-x}M_xO_2$ (where M=Co, Ni, Fe, Cr, Zn or Ta, x=0.01~0.1) or $Li_2Mn_3MO_8$ (where M=Fe, Co, Ni, Cu or Zn); $LiMn_2O_4$ with partial substitution of alkali earth metal ion for Li in the formula; disulfide compounds; and $Fe_2(MoO_4)_3$.

The positive electrode current collector is generally made with a thickness of between 3 and 500 μm. The positive electrode current collector is not limited to any particular type if it has high conductivity while not causing a chemical change to the corresponding battery, and for example, may include stainless steel, aluminum, nickel, titanium, calcined carbon, or aluminum or stainless steel surface-treated with carbon, nickel, titanium, and silver. The current collector may have its nanoscale textured surface to increase the adhesion of the positive electrode active material, and may come in various types including films, sheets, foils, nets, porous materials, foams, and nonwovens.

The binder is a substance which aids the bond of the active material and the conductive material and the bond to the current collector, and is generally present in an amount of 1 to 50 wt % on the basis of the total weight of the positive electrode mixture. The binder includes, but is not limited to, high molecular weight polyacrylonitrile-acrylic acid copolymer. As another example, the binder may include polyvinylidene fluoride, polyvinylalcohol, carboxymethyl cellulose (CMC), starch, hydroxypropylcellulose, regenerated cellulose, polyvinylpyrrolidone, tetrafluoroethylene, polyethylene, polypropylene, ethylene-propylene-diene monomer (EPDM), sulfonated EPDM, styrene butadiene rubber, fluorocarbon rubber, and various copolymers.

The conductive material has conductive properties while not causing a chemical change to the corresponding battery, and may be present in an amount of 1 wt % to 50 wt % on the basis of the total weight of the positive electrode mixture. For example, the conductive material includes graphite such as natural graphite or artificial graphite; carbon black such as carbon black, acetylene black, ketjen black, channel black, furnace black, lamp black, and thermal black; conductive fiber such as carbon fiber or metal fiber; metal powder such as fluoro carbon, aluminum, nickel powder; conductive whisker such as zinc oxide and potassium titanate; conductive metal oxide such as titanium oxide; conductive polymer such as polyphenylene derivatives. Optionally, the positive electrode may include a filler as a substance for inhibiting expansion.

The filler is not limited to any particular type if it is a fibrous material while not causing a chemical change to the corresponding battery, and includes, for example, olefin-based polymer such as polyethylene and polypropylene; fibrous materials such as glass fiber and carbon fiber.

In the present disclosure, the negative electrode may be obtained by applying a mixture including the negative electrode active material, a binder and a conductive material to the current collector and drying the solvent.

The negative electrode active material includes carbon and graphite materials such as natural graphite, artificial graphite, expandable graphite, carbon fiber, non-graphitizable carbon, carbon black, carbon nanotubes, fullerene, and activated carbon; metals that can be alloyed with lithium, for example, Al, Si, Sn, Ag, Bi, Mg, Zn, In, Ge, Pb, Pd, Pt, Ti, and compounds including the elements; composite compounds of the metals and the compounds with the carbon and the graphite materials; and lithium containing nitride.

The negative electrode active material of the present disclosure may further include a conductive material and/or a filler as a substance for improving the conductivity of the negative electrode active material. The conductive material and the filler are the same as the disclosure described previously with regard to the positive electrode.

The negative electrode current collector is generally with a thickness of between about 3 and 500 μm. The negative electrode current collector is not limited to a particular type if it has conductive properties while not causing a chemical change to the corresponding battery, and includes, for example, copper, stainless steel, aluminum, nickel, titanium, baked carbon, copper or stainless steel surface-treated with carbon, nickel, titanium and silver, and aluminum-cadmium alloys. Furthermore, similar to the positive electrode current collector, the negative electrode current collector may have its nanoscale textured surface to increase the adhesion of the negative electrode active material, and may come in various types including films, sheets, foils, nets, porous materials, foams, and nonwovens.

In the present disclosure, the separator is interposed between the positive electrode and the negative electrode, and an insulating thin film having high ion permeability and mechanical strength is used. The pore diameter of the separator is generally 0.01~10 μm, and the thickness is generally 5~300 μm. The separator includes, for example, olefin-based polymer such as polypropylene that is chemical resistant and hydrophobic; and a sheet or a nonwoven fabric made of glass fibers or polyethylene. Where a solid electrolyte of polymer is used as the electrolyte, the solid electrolyte may serve as a separator.

Preferably, the separator has the weight average molecular weight in the range of 1,000~20,000. Outside the molecular weight range, it will be difficult to ensure optimal tensile strength and elongation.

In addition to the positive electrode, the negative electrode, and the separator, generally the pouch-type secondary battery according to the present disclosure may further include a lithium salt-containing non-aqueous electrolyte.

The lithium salt-containing non-aqueous electrolyte includes a non-aqueous electrolyte and lithium. The non-aqueous electrolyte includes a non-aqueous electrolyte solution, an organic solid electrolyte, and an inorganic solid electrolyte.

The non-aqueous electrolyte solution includes, for example, aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The organic solid electrolyte includes, for example, polyethylene derivatives, polyethylene oxide derivatives, polypropylene oxide derivatives, phosphoric acid ester polymer, poly agitation lysine, polyester sulfide, polyvinylalcohol, polyvinylidene fluoride, and polymer having ionic dissociable groups.

The inorganic solid electrolyte includes, for example, nitride, halide, and sulfate of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4$ $Li_4SiO_4$—$LiI$—$LiOH$, $Li_3PO_4$—$Li_2S$—$SiS_2$.

The lithium salt is a material that is apt to dissolve in the non-aqueous electrolyte, and includes, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lithium lower aliphatic carboxylate, and lithium tetraphenylborate.

Furthermore, to improve the charging/discharging characteristics and flame retardancy, the non-aqueous electrolyte may include, for example, pyridine, triethylphosphite, triethanolamine, cyclic ether, ethylene diamine, n-glyme, triamide hexaphosphate, nitrobenzene derivatives, sulfur, quinone imine dye, N-substituted oxazolidinone, N,N-substituted imidazolidine, ethylene glycol dialkyl ether, ammonium salts, pyrrole, 2-methoxy ethanol, and aluminum trichloride. In some cases, the non-aqueous electrolyte may further include halogen containing solvents such as carbon tetrachloride and trifluoroethylene to give non-combustibility, and may further include carbon dioxide gas to improve high temperature maintenance.

While the present disclosure has been hereinabove described with respect to the limited number of embodiments and drawings, the present disclosure is not limited thereto, and it is obvious that various modifications and changes can be made by persons having ordinary skill in the technical field to which the present disclosure pertains within the technical aspects of the present disclosure and the scope of equivalents to which the appended claims are entitled.

What is claimed is:

1. A pouch-type secondary battery comprising: an electrode assembly including a positive electrode, a negative electrode, a separator interposed between the positive electrode and the negative electrode, and an electrolyte solution,
wherein the electrode assembly and the electrolyte solution are received in an internal pouch such that electrode leads are drawn from the internal pouch, the internal pouch formed by a pouch sheet that includes a heat fusion layer, a metal layer, and an outer layer in a sequential order, wherein the outer layer of the internal pouch consists of oriented nylon film,
the internal pouch is received in an external pouch such that the electrode leads are drawn from the external pouch,
wherein a first lead tape is attached to first positions on respective electrode leads at an internal pouch sealing part, and a second lead tape is attached to second positions on the respective electrode leads different from the first positions and to an external pouch sealing part, and
a safety member is included in a space between the internal pouch and the external pouch, wherein the safety member is absent from the internal pouch,
wherein the electrolyte solution is not included in the space between the internal pouch and the external pouch.

2. The pouch-type secondary battery according to claim 1, wherein the safety member is one selected from the group consisting of nitrogen gas, alkylene glycol, 1,3-propenediol, ferrocene derivatives, organic acid-based compounds, dodecafluoro-2-methylpentan-3-one, decafluoro-2-methylbutan-3-one, 1,1,1,3,3,4,4,5,5,5-decafluoropentan-2-one, 1,1,1,2,2,4,4,5,5,5-decafluoropentan-3-one, 1,1,1,4,4,5,5,5-octafluoro-3-bis(trifluoromethyl)-pentan-2-one, dodecafluoro-4-methylpentan-2-one, dodecafluoro-3-methylpentan-2-one, dodecafluoro-3,3-(dimethyl)butan-2-one and dodecafluorohexan-3-one, or mixtures thereof.

3. The pouch-type secondary battery according to claim 1, wherein a volume of the space between the internal pouch and the external pouch is 5 vol % or more and less than 10 vol % on the basis of the total volume of the pouch-type secondary battery fabricated in the end.

4. The pouch-type secondary battery according to claim 1, wherein the internal pouch sealing part is folded up or down except at an end part from which electrode terminals are drawn, and the internal pouch is received in the external pouch.

5. A method for fabricating the pouch-type secondary battery defined in claim 1, comprising:
(S1) receiving the electrode assembly in the internal pouch such that the electrode leads are drawn from the internal pouch, and hermetically sealing edges of the internal pouch;
(S2) receiving the internal pouch in the external pouch such that the electrode leads are drawn from the external pouch, and hermetically sealing edges of the external pouch except an electrode lead draw part and an inlet through which the safety member is to be introduced;
(S3) introducing the safety member into a space between the internal pouch and the external pouch through the inlet; and
(S4) completely hermetically sealing the inlet.

6. The pouch-type secondary battery according to claim 1, wherein the safety member is in a solid state.

7. The pouch-type secondary battery according to claim 6, wherein the solid safety member is a film.

8. The pouch-type secondary battery according to claim 6, wherein the solid safety member is in an envelope made of an insulating non-woven fabric.

9. A method for fabricating the pouch-type secondary battery defined in claim 6, comprising:
(S1) receiving the electrode assembly in the internal pouch such that the electrode leads are drawn from the internal pouch, and hermetically sealing edges of the internal pouch;
(S2) receiving the internal pouch in the external pouch such that the electrode leads are drawn from the external pouch, and hermetically sealing edges of the external pouch except an electrode lead draw part and an inlet through which the safety member is to be introduced;
(S3) introducing the safety member into a space between the internal pouch and the external pouch through the inlet; and
(S4) completely hermetically sealing the inlet.

10. The method according to claim 9, wherein the step (S3) is performed before steps (S1) and (S2).

11. The method according to claim 10, wherein the step (S3) includes:
attaching the solid safety member in the form of a film to an outer surface of the internal pouch or an inner surface of the external pouch.

12. The method according to claim 10, wherein the step (S3) includes:
putting the solid safety member in an envelope made of an insulating non-woven fabric,
sealing the envelope, and
placing the envelope on or attaching the envelope to an outer surface of the internal pouch or an inner surface of the external pouch.

13. The pouch-type secondary battery of claim 1, wherein a material of the first lead tape is different from a material of the second lead tape.

14. The pouch-type secondary battery according to claim 1, wherein edges of the internal pouch are hermetically sealed.

15. The pouch-type secondary battery according to claim 1, wherein the safety member is nitrogen gas.

16. The pouch-type secondary battery according to claim 1, wherein the outer layer of the internal pouch is 10-120 micrometers thick.

17. A pouch-type secondary battery comprising: an electrode assembly including a positive electrode, a negative electrode, a separator interposed between the positive electrode and the negative electrode, and an electrolyte solution,
wherein the electrode assembly and the electrolyte solution are received in an internal pouch such that electrode leads are drawn from the internal pouch, the internal pouch formed by a pouch sheet that includes a heat fusion layer, a metal layer, and an outer layer in a sequential order, wherein the outer layer of the internal pouch consists of polyethyleneterephthalate,
the internal pouch is received in an external pouch such that the electrode leads are drawn from the external pouch,
wherein a first lead tape is attached to first positions on respective electrode leads at an internal pouch sealing part, and a second lead tape is attached to second positions on the respective electrode leads different from the first positions and to an external pouch sealing part, and a safety member is included in a space between the internal pouch and the external pouch, wherein the safety member is absent from the internal pouch, wherein the electrolyte solution is not included in the space between the internal pouch and the external pouch.

* * * * *